United States Patent
Ahn et al.

(10) Patent No.: US 8,344,584 B2
(45) Date of Patent: Jan. 1, 2013

(54) STATOR OF MOTOR AND WASHING MACHINE HAVING THE SAME

(75) Inventors: In Geun Ahn, Changwon-si (KR); Min Kyu Lim, Changwon-si (KR)

(73) Assignee: LG Electronics, Inc., Seoul (KR)

( * ) Notice: Subject to any disclaimer, the term of this patent is extended or adjusted under 35 U.S.C. 154(b) by 864 days.

(21) Appl. No.: 12/305,707

(22) PCT Filed: Jun. 20, 2007

(86) PCT No.: PCT/KE2007/002997
§ 371 (c)(1),
(2), (4) Date: Dec. 19, 2008

(87) PCT Pub. No.: WO2007/148920
PCT Pub. Date: Dec. 27, 2007

(65) Prior Publication Data
US 2010/0236297 A1 Sep. 23, 2010

(30) Foreign Application Priority Data

Jun. 21, 2006 (KR) .......................... 10-2006-0055888
Jun. 26, 2006 (KR) .......................... 10-2006-0057649

(51) Int. Cl.
*H02K 1/12* (2006.01)
(52) U.S. Cl. ............ 310/254.1; 310/88; 310/91; 68/3 R; 68/212
(58) Field of Classification Search ............... 68/212
See application file for complete search history.

(56) References Cited

U.S. PATENT DOCUMENTS

| 6,075,304 | A | 6/2000 | Nakatsuka |
| 6,166,474 | A | 12/2000 | Kohara et al. |
| 6,914,363 | B2 * | 7/2005 | Kim et al. ................... 310/261.1 |
| 2004/0068857 | A1 | 4/2004 | Park |
| 2004/0163423 | A1 * | 8/2004 | Kim et al. ..................... 68/12.16 |
| 2005/0057108 | A1 * | 3/2005 | Kim et al. .................. 310/67 R |
| 2005/0162024 | A1 * | 7/2005 | Lim et al. ......................... 310/51 |
| 2005/0189837 | A1 * | 9/2005 | Lee ............................... 310/217 |

FOREIGN PATENT DOCUMENTS

CN 1489261 4/2004
(Continued)

OTHER PUBLICATIONS

Notification of Transmittal of the International Search Report and the Written Opinion of the International Searching Authority.

(Continued)

*Primary Examiner* — Michael Kornakov
*Assistant Examiner* — Jason Ko
(74) *Attorney, Agent, or Firm* — KED & Associates, LLP (57) ABSTRACT

The present invention relates to a stator of an electric motor and a washing machine having the same, wherein the stator includes a stator core of a stack of bases each with a plurality of poles, an insulator having an upper insulator and a lower insulator fastened to the stator core, a plurality of fastening portions each having a fastening hole for fastening the stator, and a plurality of connection portions each having a plurality of vertical ribs for connecting the insulator to each of the fastening portions, wherein the insulator, the fastening portions, and the connection portions are injection molded as one unit, with the stator core inserted thereto.

18 Claims, 5 Drawing Sheets

FOREIGN PATENT DOCUMENTS

| | | |
|---|---|---|
| CN | 1206785 | 6/2005 |
| DE | 199 38 310 | 3/2000 |
| EP | 1 541 738 | 6/2005 |
| RU | 2 051 250 | 12/1995 |
| RU | 2 076 437 | 3/1997 |
| RU | 2 352 698 | 1/2006 |
| SU | 838914 | 6/1981 |

OTHER PUBLICATIONS

Russian Notice of Allowance dated Oct. 18, 2011.
Chinese Office Action dated Jan. 11, 2011 (Application No. 200780030852.3).
Russian Office Action dated Mar. 1, 2011. (Application No. 2009101781/09(002208)).

* cited by examiner

STATOR OF MOTOR AND WASHING MACHINE HAVING THE SAME

TECHNICAL FIELD

The present invention relates to a stator of an electric motor and a washing machine having the same. More specifically, the present invention relates to a stator having a reinforced fastening portion of the stator, and a washing machine having the same.

BACKGROUND ART

Generally, a drum type washing system, washing laundry by using friction between a drum rotated by driving force of a motor and the laundry in a state detergent, washing water, and the laundry are introduced to the drum, shows almost no damage to the laundry, no entangling of the laundry, and is able to provide a washing effect of pounding and rubbing the laundry.

In related art drum type washing machines, depending on driving systems, there are indirect coupling type washing machines in which the driving force of the motor is transmitted to the drum through a belt wound around a motor pulley and a drum pulley indirectly, and a direct coupling type washing machines in which the driving force of the motor is transmitted to the drum directly owing to a rotor of a BLDC motor directly coupled to the drum.

A system in which the driving force of the motor is transmitted to the drum, not directly, but indirectly through the belt wound around the motor pulley and the drum pulley causes an energy loss in a course of driving force transmission, and generates much noise in the course. Therefore, in order to solve the problems of the related art drum type washing machine, it is a trend that use of the direct coupling drum type washing machine increases.

A structure of the related art direct coupling drum type washing machine will be described briefly with reference to FIG. 1.

Figure 1:
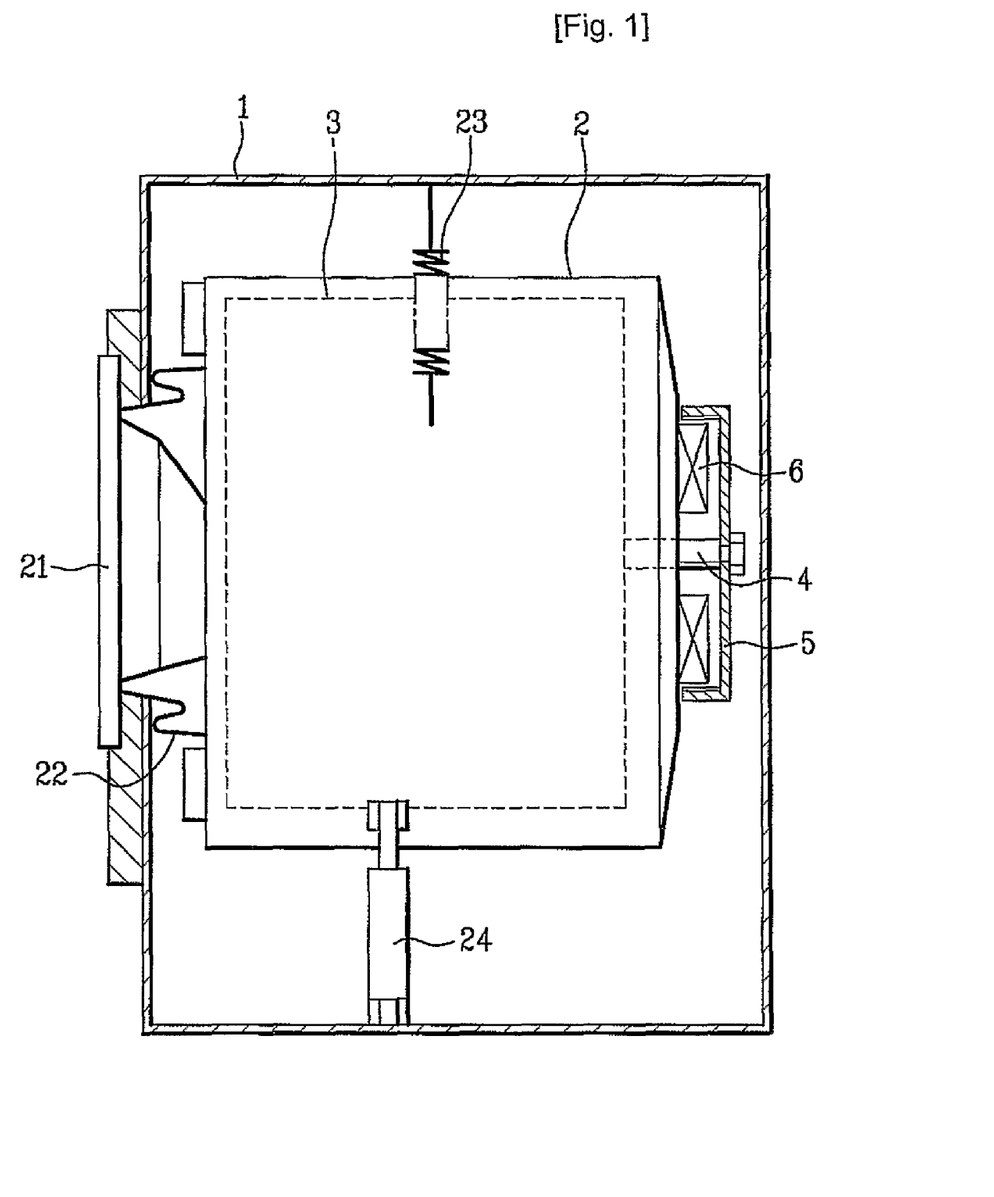
FIG. 1 illustrates a longitudinal section of a related art drum type washing machine.

FIG. 1 illustrates a longitudinal section of a related art drum type washing machine, provided with a tub 2 in a cabinet 1, and a drum 3 rotatably mounted in the tub 2 at a center thereof. There is a motor mounted on a rear of the tub 2, wherein a stator 6 is fixedly secured to a rear wall of the tub, and a rotor 5, surrounding the stator 6, is connected to the drum 3 with a shaft 4 passed through the tub.

In the meantime, there is a door 21 mounted to a front of the cabinet 1, and mounted between the door 21 and the tub 2, there is a gasket 22. There are hanging springs between an inside of an upper side of the cabinet 1 and an upper side of an outside circumference of the tub 2, for supporting the tub 2, and friction dampers 24 between an inside of a lower side of the cabinet 1, and an underside of the outside circumference of the tub 2, for damping vibration of the tub 2 generated at the time of spinning.

Figure 2:
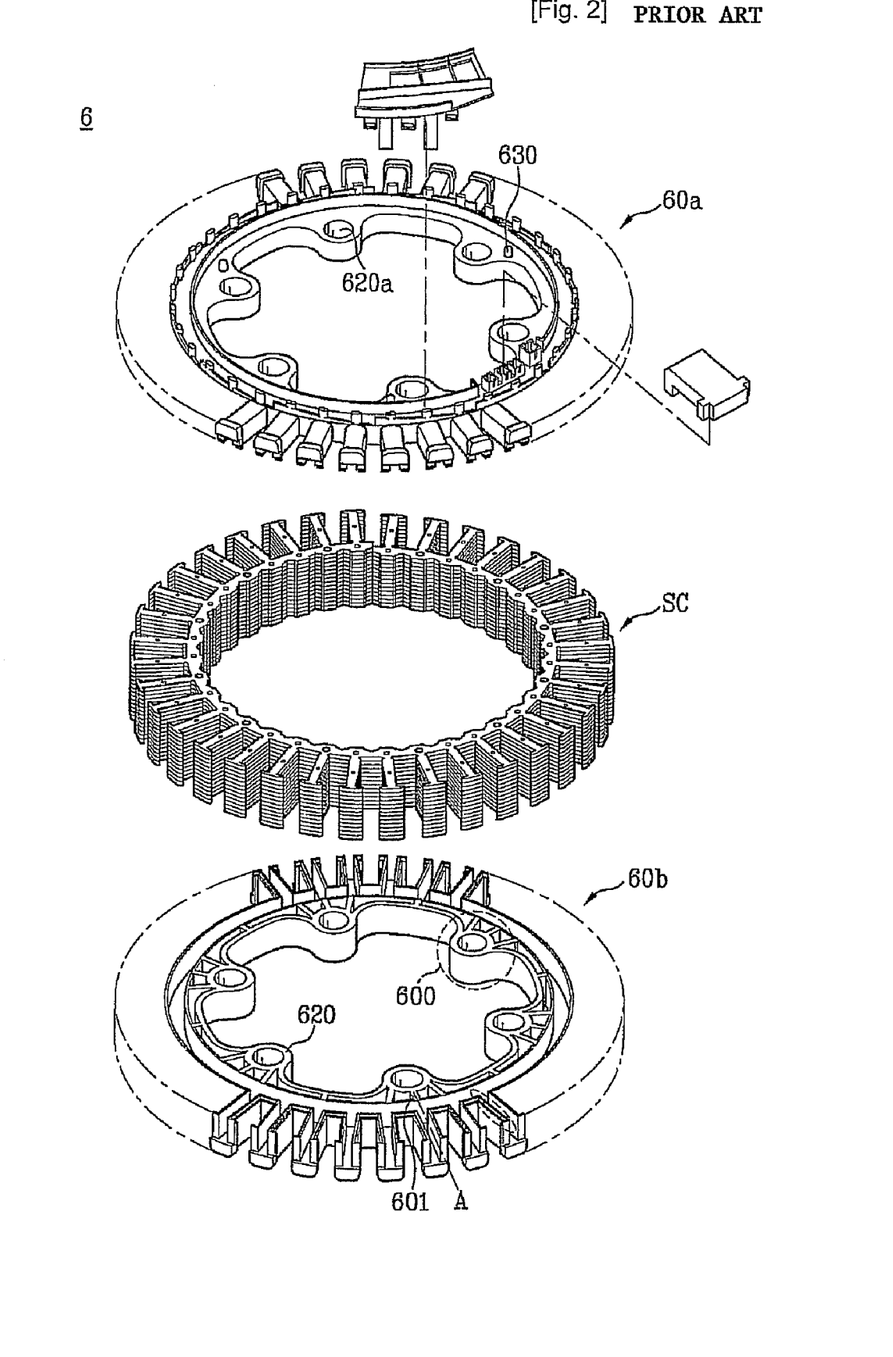
FIG. 2 illustrates a perspective view of the stator in FIG. 1.

FIG. 2 illustrates a related art stator mounted to the tub rear wall.

Referring to FIG. 2, the related art stator 6 is provided with a spiral core SC, an upper insulator 60a of an electric insulating material encapsulating an upper side of the spiral core SC in a shape in conformity with the spiral core SC, and a lower insulator 60b of an electric insulating material encapsulating a lower side of the spiral core SC in a shape in conformity with the spiral core SC when the lower insulator 60b and the upper insulator 60a are assembled together. There are fastening portions 600 each formed as one unit respectively with the lower insulator 60b and the upper insulator 60a on an inner side of the spiral core SC for securing the stator to a fixing side.

In the meantime, the fastening portion 600 has fastening holes 620a for fastening the stator 6 to the fixing side with fastening members, each formed in a boss 620 projected to an unexposed side of the fastening portion 600. Around each of the fastening holes 620a of the fastening portion 600 of the upper insulator 60a, there is a positioning projection 630 formed in conformity with a positioning recess (not shown) or positioning hole (not shown) in the fixing side.

DISCLOSURE OF INVENTION

Technical Problem

However, the related art stator has a problem in that breakage takes place at the fastening portion. That is, a heat generated at the stator at the time the motor is driven gives thermal stress to the fastening portions repeatedly, to cause the breakage at last.

Technical Solution

To solve the problems, an object of the present invention is to suggest a stator fastening structure reinforced more structurally, and a stator more positively joined as well as enhancing working efficiency owing to an inserted injection molding of the stator core and the fastening structure.

To achieve these objects and other advantages and in accordance with the purpose of the invention, as embodied and broadly described herein, in a washing machine having a motor for providing rotative driving force required for washing, a stator of the motor includes a stator core of a stack of bases each with a plurality of poles, an insulator having an upper insulator and a lower insulator fastened to the stator core, a plurality of fastening portions each having a fastening hole for fastening the stator, and a plurality of connection portions each having a plurality of vertical ribs for connecting the insulator to each of the fastening portions, wherein the insulator, the fastening portions, and the connection portions are injection molded as one unit, with the stator core inserted thereto.

Preferably, the vertical ribs of the connection portion are arranged such that directions of the lines of the extension of the poles nearest to the vertical ribs are not the same with the directions of arrangement of the vertical ribs, respectively.

Each of the connection portions may include a center vertical rib which connects each of the fastening portions to the insulator with a shortest distance, and preferably the center vertical rib is arranged between lines of extension of two poles nearest to the center vertical rib.

In the meantime, the vertical ribs of each of the connection portions are symmetry with respect to the center vertical rib.

The connection portion of the present invention may further include a horizontal web which connects the vertical ribs, and preferably the vertical ribs are symmetry with respect to the horizontal web, vertically. In this case, the horizontal web has drain holes.

In the meantime, preferably, the fastening portions are arranged oppositely along an inside circumference of the stator core, and other fastening portions are symmetry with respect to each of the fastening portions and the fastening portions arranged, oppositely.

In the stator of the present invention, preferably, each of the fastening portions has a height greater than a height of each of the vertical ribs.

In the meantime, the stator core may have pass through holes formed therein for connecting the upper portion and the lower portion of the insulator, and preferably, the washing machine may further include injection molding gate portions formed such that at least a portion of the gate portions overlaps with each of the pass through holes.

The insulator includes a vertical circumferential rib formed on an upper surface thereof along a circumferential direction, and the gate portions are located on the circumferential rib.

In the meantime, each of the injection molding gate portions are arranged spaced a predetermined distance away from an extension line of a line that connects a center of the fastening portion to a center of the stator core.

In another aspect of the present invention, a stator of an electric motor includes a stator core of a stack of bases each with a plurality of poles, an insulator having an upper insulator and a lower insulator fastened to the stator core, a plurality of fastening portions each having a fastening hole for fastening the stator, and a plurality of connection portions each having a plurality of vertical ribs for connecting the insulator to each of the fastening portions, wherein the vertical ribs of the connection portion are arranged such that directions of the lines of the extension of the poles nearest to the vertical ribs are not the same with the directions of arrangement of the vertical ribs, respectively.

In another aspect of the present invention, a stator of an electric motor includes a stator core of a stack of bases each with a plurality of poles, an insulator having an upper insulator and a lower insulator fastened to the stator core, a plurality of fastening portions each having a fastening hole for fastening the stator, and a plurality of connection portions each having a plurality of vertical ribs for connecting the insulator to each of the fastening portions, wherein the insulator, the fastening portions, and the connection portions are injection molded as one unit, with the stator core inserted thereto.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE FOR CARRYING OUT THE INVENTION

Reference will now be made in detail to the specific embodiments of the present invention, examples of which are illustrated in the accompanying drawings. Wherever possible, the same reference numbers will be used throughout the drawings to refer to the same or like parts.

In comparison to the related art washing machine in FIG. 1, a washing machine of the present invention has no substantial difference from the related art washing machine, except a structure of the stator. Therefore, the stator of the present invention will be described hereinafter, while descriptions of other elements are omitted.

Figure 3:
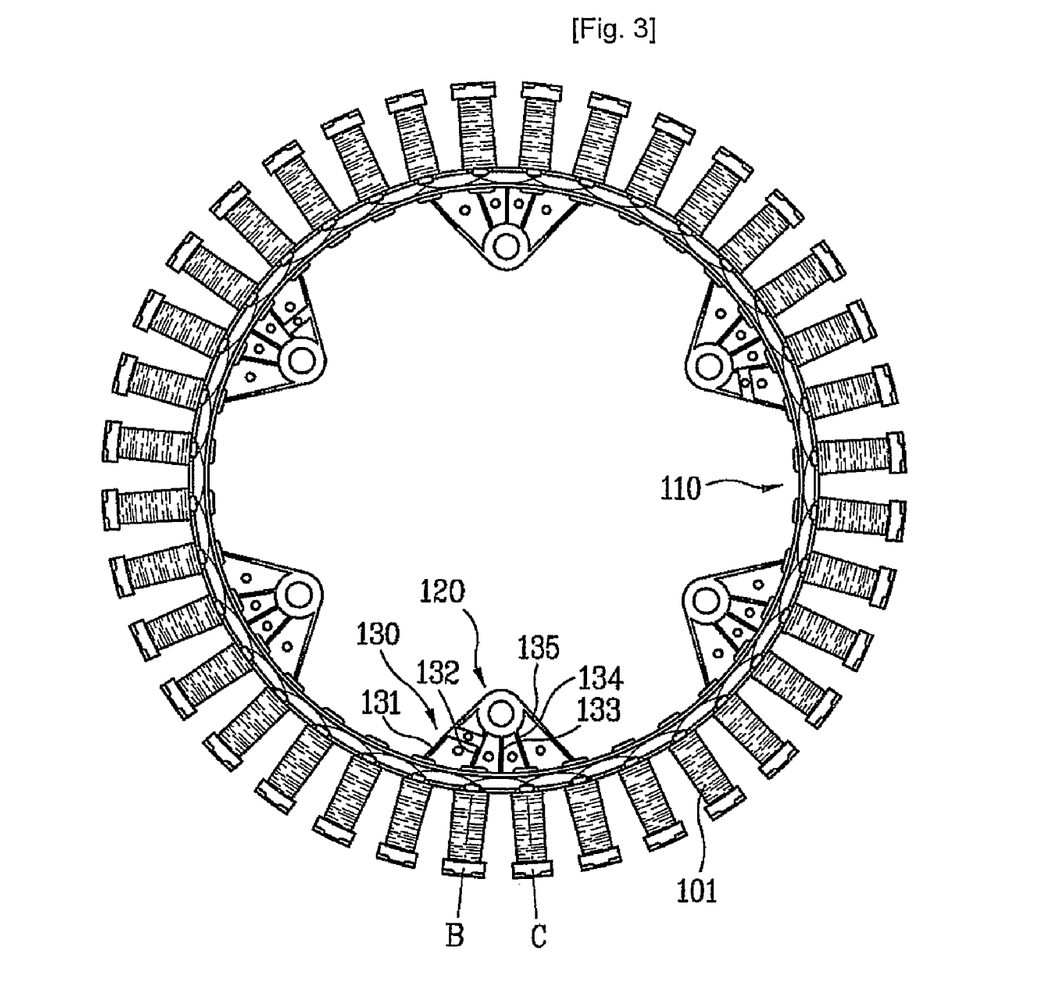
FIG. 3 illustrates a plan view of a stator in accordance with a preferred embodiment of the present invention.
Figure 4:
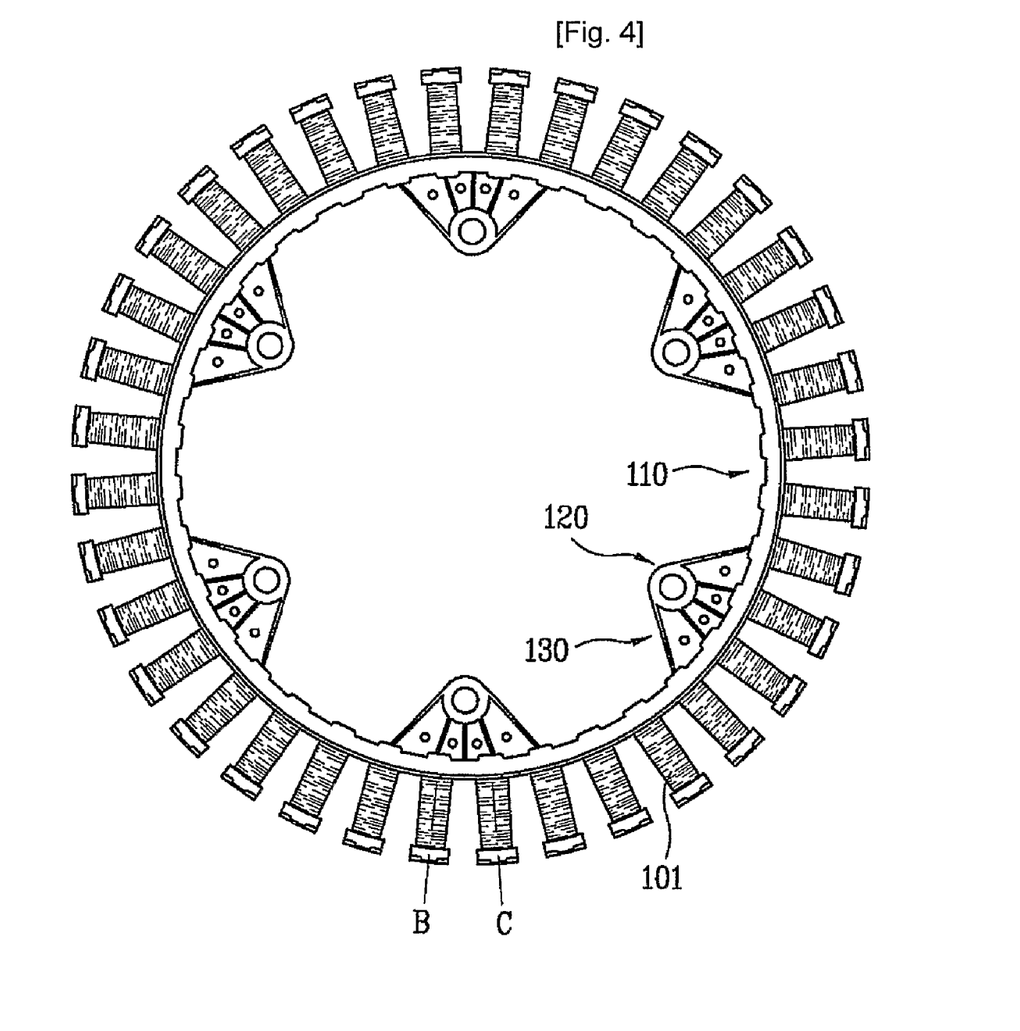
FIG. 4 illustrates a bottom view of the stator in FIG. 3.

FIG. 3 illustrates a plan view of a stator in accordance with a preferred embodiment of the present invention, and FIG. 4 illustrates a bottom view of the stator in FIG. 3.

Referring to FIGS. 3 and 4, an insulator 110 fastened to a stator core 140, and fastening portions 120 arranged on an inner side of the stator are connected to the insulator 110 with connection portions 130, respectively.

It is preferable that all of the fastening portions 120, the insulator 110, and the connection portions 130 of the stator of the present invention are formed as one unit with plastic injection molding. Moreover, it is preferable that the fastening portions 120, the insulator 110, and the connection portions 130 are injection molded in a state the stator core 140 is inserted in the mold, such that the fastening portions 120, the insulator 110, and the connection portions 130 are joined together with the stator core 140.

In this instance, the insulator 110 encloses poles 141 of the insulator 110, and serves as an insulator. The drawings illustrate portions of the insulator 110 that enclose the poles 141, having coils 101 wound thereon, respectively.

The stator is fixedly secured to a rear of a tub of the washing machine in FIG. 1 with fastening bolts. For above fastening, the fastening portion 120 has a fastening hole for pass through of the bolt. It is preferable that there are washers (not shown) between the bolt and the fastening portion 120 or the tub and the fastening portion 120.

In the meantime, the connection portion 130, formed vertically, has a plurality of vertical ribs 131~135 for connecting the fastening portion 120 to the insulator 110, vertically.

The center vertical rib 133 connects the fastening portion 120 to the insulator 110 with a shortest distance. As shown, it is preferable that, if the vertical ribs are arranged on nearest lines B and C of extension of the poles 141 respectively, the vertical ribs are arranged such that directions of the lines B and C of the extension are not the same with the directions of arrangement of the vertical ribs, respectively.

The center vertical rib 133 is arranged between the lines B and C of extension of adjacent two poles, and other vertical ribs 131, 132, 134, and 135 are arranged symmetry with respect to the center vertical rib 133. That is, it is preferable that the first vertical rib 131 and the second vertical rib 132 are arranged symmetry to the fourth vertical rib 135 and the third vertical rib 134 with respect to the center vertical rib 133. Between the first vertical rib 131 and the second vertical rib 132, there may be a positioning projection 138.

In the meantime, the vertical ribs 131~135 are connected with a horizontal web 136 with drain holes 137 formed therein. It is preferable that the fastening portions 120 and the vertical ribs 131~135 of the connection portion 130 are symmetry with respect to the horizontal web 136 in a vertical direction. That is, as shown in FIGS. 3 and 4, except the positioning projection 138, upper portions and lower portions of the fastening portions 120 and the connection portion 130 are symmetry, respectively.

If the vertical ribs 131~135 of the connection portion 130 are asymmetry in the vertical direction, stresses caused by thermal expansion or contraction of the vertical ribs 131~135 to be applied to the upper portion and the lower portion of the fastening portion 120 will be different, to cause another problem of strength impairment of the fastening portion 120.

Therefore, if the vertical ribs 131~135 are symmetry with respect to the horizontal web 136 vertically, above problem can be solved.

Along with this, referring to FIGS. 3 and 4, it is preferable that the fastening portions are arranged on an inner side of the stator core 140 along an inside circumference thereof symmetrically. That is, each of the fastening portions has an opposite fastening portion, and other fastening portions are symmetry with respect to a line connecting each of the fastening portions and the opposite fastening portion. This symmetric arrangement of the fastening portions enables easy positioning of a center of the stator to a portion of the tub where the center of the stator is to be positioned at the time the stator is mounted to the tub.

Figure 6:
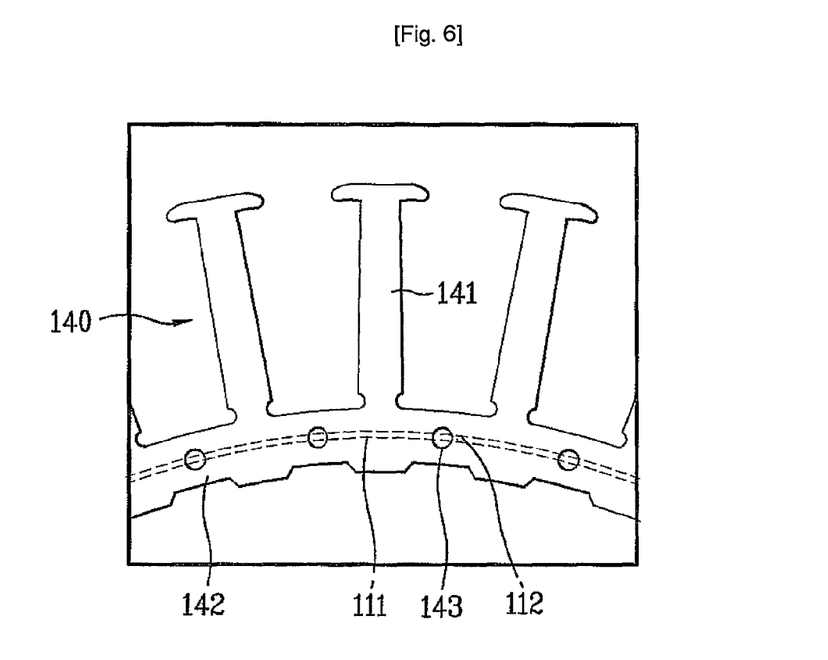
FIG. 6 illustrates a partial enlarged view of the stator in accordance with a preferred embodiment of the present invention, showing a positional relation between pass through holes and gate portions.

Moreover, referring to FIG. 6, the stator core 140 may have pass through holes 143 for pass through of molten plastic at the time of injection molding to connect the upper portion and the lower portion of the insulator 110. In this case, portions of the insulator 110 filled in the pass through holes 143 make joining of the core 140 with the insulator 110 stronger. Moreover, the portions filled in the pass through holes 143 reduce thermal deformation of the insulator 110 and the fastening portions 120, reducing stress to be applied to the fastening portions 120.

The insulator 110 may have a vertical circumferential rib 111 formed along a circumferential direction of the insulator 110.

In the meantime, gate portions 112 through which molten plastic is injected may be located along the circumferential rib 111. It is preferable that the gate portions 120 are located, not on extension lines D each of which connects a center of the fastening portion 120 and a center of the stator core 140, but spaced a predetermined distance away from the extension line D.

Figure 5:
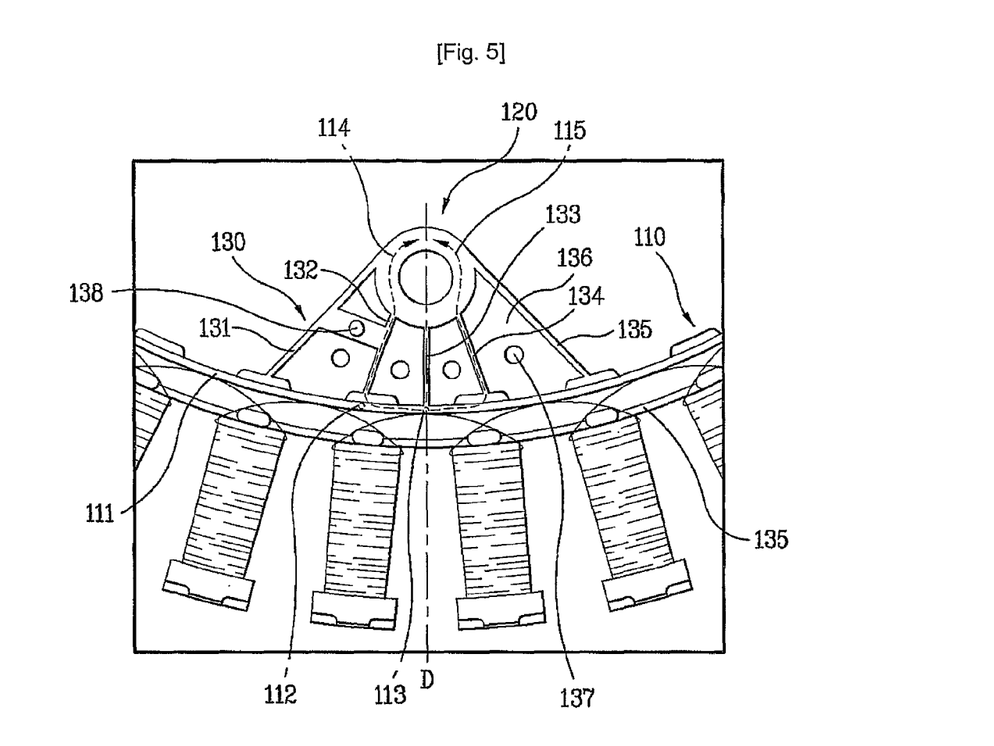
FIG. 5 illustrates a partial enlarged view of the stator in FIG. 3.

Alike an imaginary gate portion 113 shown in FIG. 5, if the gate portion is located on the extension line D, the molten plastic will flow through a left side path 114 and a right side past 115 to meet at a center of the fastening portion 120 and form a boundary surface. Because the boundary surface has strength weaker than other portions, the boundary surface can be a cause of breakage of the fastening portion 120. Consequently, the gate portion 112 is arranged spaced a distance away from the extension line D.

Referring to FIG. 6, it is preferable that at least of a portion of the gate portion 112 overlaps with the pass through hole 143 in the stator core 140, for smooth downward flow of the molten plastic through the pass through hole 143.

Referring to FIGS. 3~5, the fastening portion 120 has height greater than height of the vertical ribs 131~135 of the connection portion 130. If the height of the vertical ribs 131~135 is greater than the height of the fastening portion 120, a washer and the vertical ribs 131~135 can interfere with each other at the time the washer is placed on the fastening portion 120, failing positive fastening of the stator to the tub. If there is a gap between the washer and the fastening portion 120, the gap is liable to cause loosening of the stator from the tub during operation. It is because of the thermal deformation of the fastening portion 120 and the like coming from driving of the motor, even though the stator can be fastened to the tub tightly initially despite of existence of the gap.

INDUSTRIAL APPLICABILITY

The present invention can provide a stator fastening structure much stronger than before, increase working efficiency, and enables securer fastening of the stator owing to the insert injection molding.

Moreover, the present invention can provide a washing machine having a stator fastened to the tub more securely, and a breakage problem of the fastening portion caused by the thermal deformation during operation prevented.

The invention claimed is:

1. A washing machine having a motor for providing rotative driving force required for washing, a stator of the motor comprising:
   a stator core of a stack of bases each with a plurality of poles;
   an insulator having an upper insulator and a lower insulator fastened to the stator core;
   a plurality of fastening portions each having a fastening hole for fastening the stator;
   a plurality of connection portions each having a plurality of vertical ribs for connecting the insulator to each of the fastening portions; and
   a horizontal web that connects the plurality of vertical ribs, the horizontal web is formed on a plane perpendicular to the plurality of vertical ribs,
   wherein the insulator, the fastening portions, and the connection portions are injection molded as one unit, with the stator core inserted thereto, and
   wherein each of the connection portions includes a center vertical rib that connects each of the fastening portions to the insulator with a shortest distance from among the corresponding plurality of ribs for the particular connection portion, the center vertical rib defining a center line of extension and the center vertical rib is arranged between a first line of extension of a first pole nearest to the center vertical rib and a second line of extension of a second pole nearest to the center vertical rib, wherein the first line of extension is immediately adjacent the center line of extension, and the second line of extension is immediately adjacent the center line of extension, and
   wherein no poles are provided along the center line of extension.

2. The washing machine as claimed in claim 1, wherein the plurality of vertical ribs of the connection portion are arranged such that directions of the lines of the extension of the poles nearest to the plurality of vertical ribs are not the same with the directions of the plurality of vertical ribs, respectively.

3. The washing machine as claimed in claim 1, wherein the plurality of vertical ribs of each of the connection portions are symmetric with respect to the center vertical rib.

4. The washing machine as claimed in claim 1, wherein the plurality of vertical ribs are symmetric with respect to the horizontal web vertically.

5. The washing machine as claimed in claim 1, wherein the horizontal web has drain holes.

6. The washing machine as claimed in claim 1, wherein the fastening portions are arranged oppositely along an inside circumference of the stator core.

7. The washing machine as claimed in claim 6, wherein other fastening portions are symmetrical with respect to a line connecting each of the fastening portion and the opposite fastening portion.

8. The washing machine as claimed in claim 1, wherein each of the fastening portions has a height greater than a height of each of the plurality of vertical ribs.

9. The washing machine as claimed in claim 1, wherein the stator core has pass through holes formed therein for connecting the upper portion and the lower portion of the insulator.

10. The washing machine as claimed in claim 9, further comprising injection molding gate portions formed such that at least a portion of the gate portions overlaps with each of the pass through holes.

11. The washing machine as claimed in claim 10, wherein the insulator includes a vertical circumferential rib formed on an upper surface thereof along a circumferential direction, and the gate portions are located on the circumferential rib.

12. The washing machine as claimed in claim 1, wherein each of injection molding gate portions are arranged spaced a predetermined distance away from an extension line of a line that connects a center of the fastening portion to a center of the stator core.

13. A washing machine stator comprising:
a stator core having a stack of bases each with a plurality of poles;
an insulator to fasten to the stator core;
a plurality of fastening portions, each fastening portion having a fastening hole;
a plurality of connection portions, each connection portion having a plurality of ribs for connecting the insulator to a corresponding one of the fastening portions; and
a horizontal web that connects the plurality of ribs corresponding to one of the fastening portions, and the horizontal web is formed on a plane perpendicular to the plurality of ribs,
wherein the insulator, the fastening portions, and the connection portions are injection molded as one unit, and the stator core is inserted thereto, and
wherein each of the connection portions includes a center first rib arranged on a center line, a second rib and a third rib, the second rib being adjacent a first side of the center first rib, and the third rib being adjacent a second side of the center first rib, the center first rib having a first distance to connect the corresponding one of the fastening portions to the insulator, the second rib having a second distance to connect the corresponding one of the fastening portions to the insulator and the third rib having a third distance to connect the corresponding one of the fastening portions to the insulator, the first distance being less than the second distance and the first distance being less than the third distance, and the center first rib is arranged along the center line between a first line of extension of a first pole nearest to the center first rib and a second line of extension of a second pole nearest to the center first rib, and wherein the first pole is adjacent the second pole without any poles between the first pole and the second pole, and
wherein a pole is not provided along the center line of the center first rib.

14. The washing machine stator as claimed in claim 13, wherein the plurality of ribs of each of the connection portion are arranged such that directions of the lines of the extension of the poles nearest to the plurality of ribs are not the same with the directions of the plurality of ribs, respectively.

15. The washing machine stator as claimed in claim 13, wherein the plurality of ribs are symmetric with respect to the center first rib for each of the connection portions.

16. The washing machine stator as claimed in claim 13, wherein the plurality of ribs are vertically symmetric with respect to the horizontal web.

17. The washing machine stator as claimed in claim 13, wherein the horizontal web includes drain holes.

18. The washing machine stator as claimed in claim 13, wherein the fastening portions are arranged oppositely along an inside circumference of the stator core, and other fastening portions are symmetric with respect to a line connecting each of the fastening portion and the opposite fastening portion.

* * * * *

UNITED STATES PATENT AND TRADEMARK OFFICE
CERTIFICATE OF CORRECTION

PATENT NO.         : 8,344,584 B2                     Page 1 of 1
APPLICATION NO.    : 12/305707
DATED              : January 1, 2013
INVENTOR(S)        : In Geun Ahn and Min Kyu Lim It is certified that error appears in the above-identified patent and that said Letters Patent is hereby corrected as shown below:

Title Page, item (86) should read as follows:

(86) PCT No.:        PCT/KR2007/002997
    §371 (c)(1),
    (2), (4) Date:   Dec. 19, 2008

Signed and Sealed this
Thirtieth Day of April, 2013

Teresa Stanek Rea
*Acting Director of the United States Patent and Trademark Office*